United States Patent [19]
Nickel et al.

[11] Patent Number: 6,120,238
[45] Date of Patent: Sep. 19, 2000

[54] METHOD OF MANEUVERING A SLIPSHEETED LOAD AND DRAWBAR DEVICE THEREFOR

[75] Inventors: Jeffrey D. Nickel, Fallston; John J. Salser, HdG, both of Md.

[73] Assignee: The United States of America as represented by the Secretary of the Army, Washington, D.C.

[21] Appl. No.: 09/300,052

[22] Filed: Apr. 27, 1999

[51] Int. Cl.[7] .................................................. B65G 7/00
[52] U.S. Cl. ......................... 414/787; 414/800; 294/104
[58] Field of Search ........................ 414/20, 753.1, 414/787, 800; 294/101, 102.1, 103.1, 104, 114, 132, 133; 254/213, 224

[56] References Cited

U.S. PATENT DOCUMENTS

| 1,599,966 | 9/1926 | Higgins et al. ................. 414/800 X |
| 1,911,274 | 5/1933 | Handley ................................ 294/133 |
| 3,851,358 | 12/1974 | Janosko ................................ 294/104 |
| 4,046,353 | 9/1977 | Buschmann ........................ 294/133 |
| 4,217,071 | 8/1980 | Ault ................................... 294/104 X |
| 4,831,693 | 5/1989 | Veith et al. ..................... 294/102.1 X |
| 5,399,060 | 3/1995 | Richert ............................ 414/753.1 X |
| 5,454,899 | 10/1995 | Glenn et al. .................... 294/103.1 X |

FOREIGN PATENT DOCUMENTS

| 256115 | 4/1988 | German Dem. Rep. ............. 294/101 |
| 3317111 | 11/1984 | Germany ............................. 294/114 |
| 1393761 | 5/1988 | U.S.S.R. ............................ 294/103.1 |
| 1622280 | 1/1991 | U.S.S.R. ............................ 294/103.1 |

Primary Examiner—James W. Keenan
Attorney, Agent, or Firm—Paul S. Clohan, Jr.; U. John Biffoni

[57] ABSTRACT

A drawbar device that facilitates engagement to, maneuvering of, and disengagement from a loaded slipsheet includes a top plate, base plate, and roller for frictionally engaging a slipsheet tab, a means for disengaging the roller therefrom, and a connecting means for transmitting to the base plate the force necessary for maneuvering the loaded slipsheet. The present invention advantageously facilitates the movement of heavy supplies and material in the absence of conventional mechanized material handling equipment.

14 Claims, 2 Drawing Sheets

METHOD OF MANEUVERING A SLIPSHEETED LOAD AND DRAWBAR DEVICE THEREFOR

The invention described herein may be manufactured, used, and/or licensed by or for the United States Government.

BACKGROUND OF THE INVENTION

1. Field of the Invention

This invention relates generally to the maneuvering of a load by means of a slipsheet. The invention relates more specifically to a drawbar device and a method of using the device that facilitates engagement to, maneuvering of, and disengagement from, a loaded slipsheet.

2. Discussion of the Prior Art

A slipsheet is a thin, flexible plate or sheet, which acts both as a support for a load, and as a means for grasping the load to maneuver it as a unit. A slipsheet constructed of materials such as high density polyethylene or fiber reinforced paper can be very durable, allowing for multiple reuse or extended dragging of loads of up to 8,000 pounds even over harsh surfaces such as gravel and textured concrete.

Conventionally, handling of a heavily-loaded slipsheet has been accomplished exclusively with variations of dedicated forklift-style trucks, using hydraulic power to grasp and move the load. In a quick response situation, however, such as an early entry military action or disaster relief, such mechanized equipment may not be available, and the inability to maneuver heavily-loaded slipsheets can detrimentally affect the outcome of the efforts.

SUMMARY OF THE INVENTION

It is an object of the present invention to provide a device that advantageously facilitates the movement of heavy supplies and material in the absence of conventional mechanized material handling equipment.

Accordingly, the invention relates to a drawbar device and a method of using the device that facilitates engagement to, maneuvering of, and disengagement from, a loaded slipsheet.

Through the use of the drawbar device and a means for transmitting a pulling force, relatively heavy loads can be repositioned more quickly, safely and efficiently than was possible before in circumstances where conventional equipment is unavailable. Thus, load manipulation can now be augmented using other sources of power, specifically human power, for certain applications.

BRIEF DESCRIPTION OF THE DRAWINGS

Other objects, features, and advantages of the present invention will become more fully apparent from the following detailed description of the preferred embodiments, the appended claims, and the accompanying drawings. As depicted in the attached drawings:

DESCRIPTION OF THE PREFERRED EMBODIMENTS

The present invention will be disclosed in terms of the currently perceived preferred embodiments thereof In FIGS. 1–5, the means for attaching the drawbar device to a means for transmitting sufficient force to maneuver the slipsheeted load is depicted as a connector for engaging a non-rigid device. As one skilled in the art can appreciate, however, other configurations of connectors are encompassed by the present invention, such as, for example, a pivotable sleeve that can engage a rigid arm.

Figure 1:
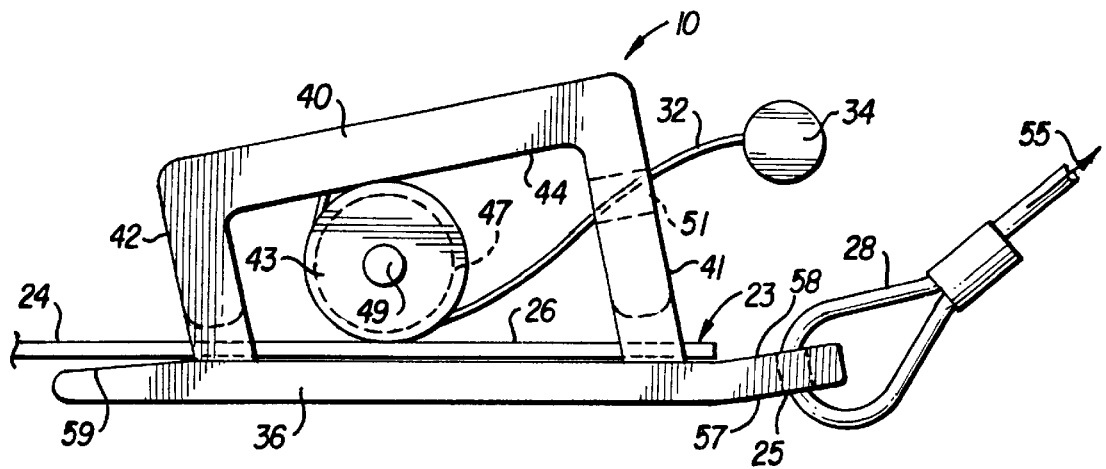
FIG. 1 is a profile view of a drawbar device constructed in accordance with the teachings of present invention shown in operative cooperation with a slipsheet.

Referring to FIG. 1, a drawbar device 10 constructed in accordance with a first preferred embodiment of the present invention is shown in operative cooperation with a standard, commercially-available slipsheet 24 and with a means 28 for transmitting tension to the drawbar device from a means 55 for applying sufficient force to maneuver the drawbar device.

The drawbar device 10 includes an inclined top plate 40, base plate 36, and roller 43 having a first diameter. In this embodiment, the slipsheet tab 23, i.e., that portion of the slipsheet which extends outward from beneath the load that is placed atop the slipsheet, is positioned between roller 43 and rigid base plate 36. The top plate 40 includes a leading edge 41, i.e., that edge which leads as the device is being towed, and a trailing edge 42, i.e., that edge which trails as the device is being towed. The top plate 40 is inclined such that the vertical distance from leading edge 41 to base plate 36 is greater than the vertical distance from trailing edge 42 to base plate 36. Thus, when viewed in profile, the area enclosed by top plate 40 and base plate 36 defines a restricting cross-sectional appearance, i.e., the top plate 40 slopes downward from divergent leading edge 41 to convergent trailing edge 42.

The base plate 36, which has sufficient strength so as to not buckle during its intended use and to maintain its desired configuration, includes a leading edge 58, i.e., that edge which leads as the device is being towed, and a trailing edge 59, i.e., that edge which trails as the device is being towed. In this embodiment, leading edge 58 includes at least one aperture 25 through which tension transmitting means 28 is connected to base plate 36. The base plate trailing edge 59 can be tapered to facilitate sliding the base plate under the slipsheet tab 23 during engagement of the drawbar device 10 to the slipsheet 24.

Roller release cord 32 attached to release handle 34 penetrates inclined top plate 40 through access 51 and is wrapped around roller 43 at a circumferential area having a second diameter 47 which is smaller than the first diameter to prevent the possible interference of release cord 32 with the locking action of the roller. In an unlocked, or relaxed mode, the roller 43 is either in contact with only top plate bottom surface 44 or slipsheet tab top surface 26, or loosely in contact with both top plate bottom surface 44 and slipsheet tab top surface 26. As the base plate 36 is slid under the slipsheet tab 23 during engagement of the drawbar device 10 to the slipsheet 24, the roller 43 rotates and moves toward base plate trailing edge 59 to securely but detachably engage both top plate bottom surface 44 and slipsheet tab top surface 26. This allows roller 43 to lock slipsheet tab 23 against base plate 36 as the roller is wedged between the top plate bottom surface 44 and slipsheet tab top surface 26.

Figure 2:
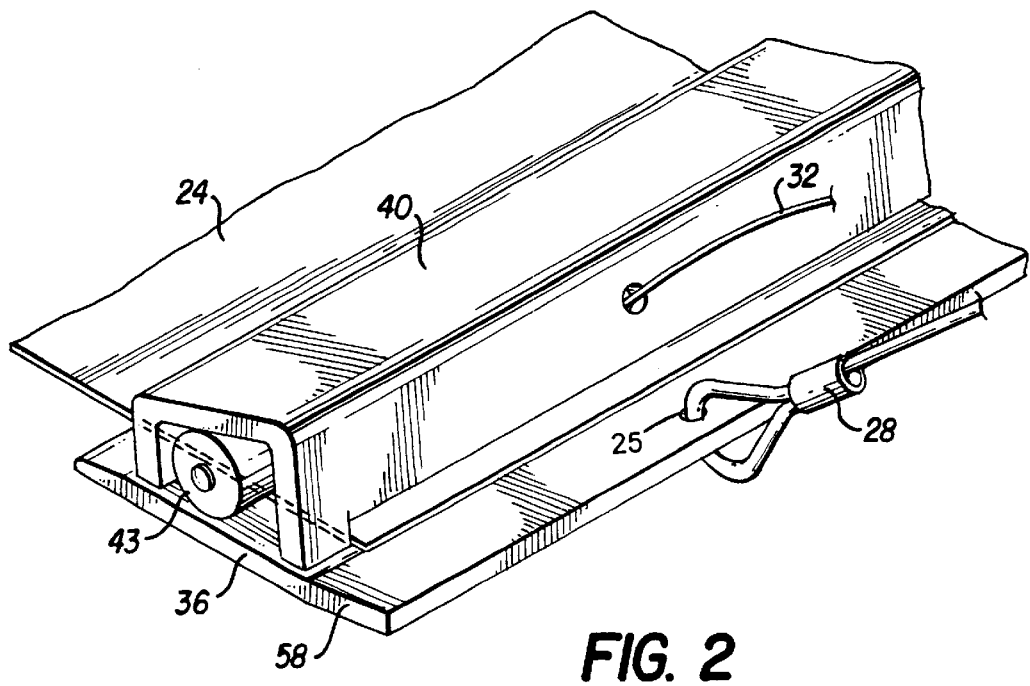
FIG. 2 is a perspective view of the drawbar device of FIG. 1 wherein the means for attaching the drawbar device to a means for transmitting sufficient force to maneuver the slipsheeted load is a cable loop.

In this first preferred embodiment as further depicted in FIG. 2, the means 28 for transmitting tension to the drawbar device is a flexible cable permanently connected to base plate leading edge 58 by means of a loop of cable which passes through aperture 25. Though depicted in FIGS. 1 and 2 as a single cable in a single aperture, other embodiments of the tension transmitting means 28 can include multiple apertures spaced along the length of the leading edge 58 with a cable, rope, or strap connected to each.

Figure 3:
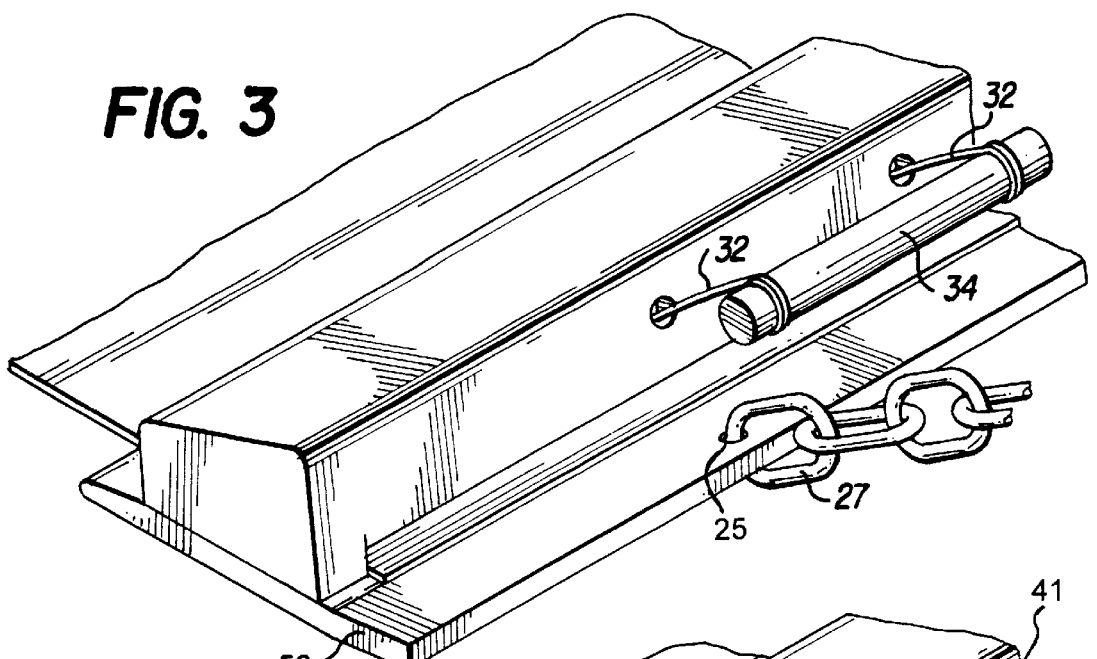
FIG. 3 is a perspective view of a drawbar device constructed in accordance with the teachings of the present invention wherein the means for attaching the drawbar device to a means for transmitting sufficient force to maneuver the slipsheeted load is a chain and wherein a plurality of release cables are employed.
Figure 4:
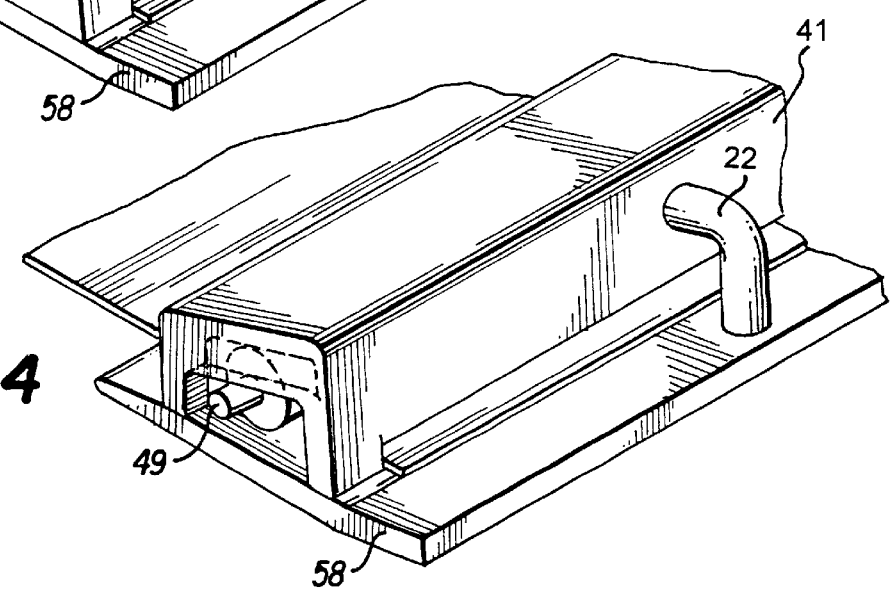
FIG. 4 is a perspective view of a drawbar constructed in accordance with the teachings of the present invention in which the means for attaching the drawbar device to a means for transmitting sufficient force to maneuver the slipsheeted load is a ring, and wherein the roller has an end tab.
Figure 5:
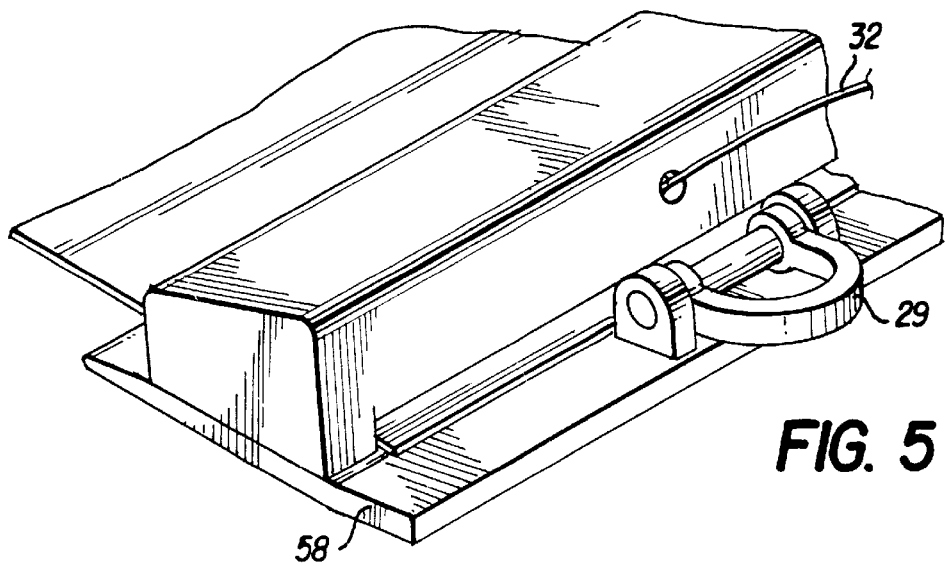
FIG. 5 is a perspective view of a drawbar constructed in accordance with the teachings of the present invention in which the means for attaching the drawbar device to a means for transmitting sufficient force to maneuver the slipsheeted load is a clevis link.

In other preferred embodiments depicted in FIGS. 3, 4, and 5, respectively, the tension transmitting means 28 can be a chain 27 connected through aperture 25, a ring 22 that is integral to top plate leading edge 41 and the top of base plate leading edge 58, or a hinged or linked clevis-type device 29 attached to the top of base plate leading edge 58.

Base plate 36 and top plate 40, though depicted as solid, or continuous, plates, may alternatively include other non-solid configurations. In a second preferred embodiment of top plate 40, the plate can be a plurality of smaller plates. That is, each of the individual plates has the same profile as top plate 40, but there is open space between adjacent smaller plates. This embodiment, while not reducing functionality, may reduce the weight of the drawbar device, thereby making it easier to manipulate. A second potential advantage of this embodiment would be to facilitate the removal of foreign objects from the roller area. A solid base plate 36, however, will afford the largest surface interaction area between roller 43, slipsheet tab 23, and base plate 36.

In FIGS. 2–5, base plate leading edge 58 is depicted as being slightly wider than the width of slipsheet tab 23. In another embodiment, however, base plate leading edge 58 can be narrower, i.e., not as wide as the width of slipsheet tab 23. That is, leading edge 58 need only be large enough to accommodate attachment of tension transmitting means 28, but not necessarily the full width of slipsheet tab 23. Regardless of the leading edge 58 width, however, the total width of drawbar device 10 must be great enough to allow the full width of slipsheet tab 23 to be inserted between the proximal and distal ends of top plate 40 without modifying slipsheet tab 23.

Base plate leading edge 58 can also have an inclined portion 57 that is inclined upward from the horizontal to facilitate movement along rough surfaces, such as gravel or uneven planked flooring, and to ease the attachment of means 55 for applying sufficient force to tension transmitting means 28.

To augment the grip of roller 43, in an optional embodiment the surface of the roller can be textured, such as having a pattern of diamond knurling, beading or a slotted surface. Alternatively, the surface of roller 43 can be coated with an adhesion-improving material, such as rubber, having either a higher coefficient of friction or a lower threshold of elastic deformation.

In an optional embodiment of roller 43 and release cord 32, roller 43 can have spaced along its length a plurality of circumferential areas having a second diameter which is smaller than the first diameter, with a plurality of release cords, each of which penetrates the top plate through an access and which is wrapped around the roller at the second diameter. The plurality of release cords 32 are preferably connected to release handle 34 to ease operation of the device.

In an embodiment of roller 43 which avoids the need for release cord 32 and access 51, the proximal and distal ends of roller 43 each include an end tab 49 as depicted in FIG. 4. In this embodiment, the roller is disengaged from top plate bottom surface 44 and slipsheet tab top surface 26 by pulling each end tab 49 toward top plate leading edge 41.

The method of using the drawbar device 10 in conjunction with a slipsheet 24 is as follows. The drawbar device 10 is aligned with slipsheet tab 23, which protrudes from under the load atop the slipsheet. While pulling roller 43 toward top plate leading edge 41, either with release cord 32 or with end tabs 49, to reduce the chance of interference of the roller with the slipsheet tab, the drawbar device 10 is simultaneously slid over the slipsheet tab and locked in position by application of means 55 for applying sufficient force to maneuver the drawbar device. That is, by pulling drawbar device 10 away from the load in a controlled manner, slowly at first, roller 43 frictionally engages both top plate bottom surface 44 and slipsheet tab top surface 26. This pulling force also increases the slipsheet locking pressure as more pulling force is exerted, therefore the weight limit of the load is governed only by the mechanical strength of slipsheet tab 23 and the available pulling force. Next, the slipsheeted load is pulled from a first location to a desired second location. This repositioning may be accomplished by any force that is sufficient to move the slipsheeted load, such as the force provided by one or more humans, a beast of burden, or mechanized means.

Once the slipsheeted load is in the desired second location, drawbar device 10 is disengaged from slipsheet tab 23. This disengagement is accomplished by pushing the drawbar device 10 toward the load while simultaneously disengaging roller 43 from top plate bottom surface 44 and slipsheet tab top surface 26 by pulling roller 43, either with release cord 32 or with end tabs 49, toward top plate leading edge 41.

The present invention, therefore, facilitates the engagement to, maneuvering of, and disengagement from, a slipsheet in the absence of conventional, mechanized material handling equipment.

While only certain preferred embodiments of this invention have been shown and described by way of illustration, many modifications will occur to those skilled in the art. For example, the use of the term "means for transmitting tension" herein is meant to denote not only embodiments such as straps, chains, and clevis links, but also includes all other types of connectors, e.g., loops, hooks, couplings, pivotable sleeves that can engage a rigid arm, and equivalent structures. It is, therefore, desired that it be understood that it is intended herein to cover all such modifications that fall within the true spirit and scope of this invention.

What is claimed is:

1. A drawbar device for maneuvering a slipsheeted load, said device comprising:

an inclined top plate having a leading edge and a trailing edge;

a base plate attached to a bottom surface of said top plate leading edge and said top plate trailing edge, said base plate having a leading edge and a trailing edge;

a cross-sectional area defined by said top plate and said base plate, said area having a divergent end at the top plate leading edge and a convergent end at the top plate trailing edge;

a roller having a proximal end and a distal end and a first diameter, said roller disposed between said top plate and said base plate and capable of frictionally engaging a bottom surface of said top plate and a top surface of a slipsheet tab;

a means for disengaging said roller from said bottom surface of said top plate and said top surface of said slipsheet tab by moving the roller toward the divergent end of said cross-sectional area; and a means for transmitting tension to said base plate leading edge to maneuver said drawbar device.

2. The drawbar device according to claim 1, wherein said base plate leading edge is inclined upward from a horizontal plane.

3. The drawbar device according to claim 1, wherein said base plate trailing edge is tapered.

4. The drawbar device according to claim 1, wherein said roller has a textured surface.

5. The drawbar device according to claim 1, wherein said roller has a surface coated with an adhesion-improving material.

6. The drawbar device according to claim 5, wherein said adhesion-improving material is rubber.

7. The drawbar device according to claim 1, wherein said roller further comprises a circumferential area having a second diameter which is smaller than said first diameter, and wherein said means for disengaging the roller is a release cord which penetrates said top plate through an access and which is wrapped around the roller at said second diameter.

8. The drawbar device according to claim 1, wherein said roller further comprises a plurality of circumferential areas having a second diameter which is smaller than said first diameter, and wherein said means for disengaging the roller is a plurality of release cords, each of which penetrates said top plate through an access and which is wrapped around the roller at said second diameter.

9. The drawbar device according to claim 1, wherein said means for disengaging the roller is an end tab located at said proximal end and an end tab located at said distal end of the roller.

10. The drawbar device according to claim 1, wherein said means for transmitting tension is a flexible cable disposed in an aperture located in said base plate leading edge.

11. The drawbar device according to claim 1, wherein said means for transmitting tension is a chain disposed in an aperture located in said base plate leading edge.

12. The drawbar device according to claim 1, wherein said means for transmitting tension is a ring that is integral to said top plate leading edge and a top surface of said base plate leading edge.

13. The drawbar device according to claim 1, wherein said means for transmitting tension is a clevis l attached to a top surface of said base plate leading edge.

14. A method of maneuvering a slipsheeted load with a drawbar device, comprising:

(a) aligning in a first location a slipsheet tab with a drawbar device, said device comprising:

an inclined top plate having a leading edge and a trailing edge;

a base plate attached to a bottom surface of said top plate leading edge and said top plate trailing edge, said base plate having a leading edge and a trailing edge;

a cross-sectional area defined by said top plate and said base plate, said area having a divergent end at the top plate leading edge and a convergent end at the top plate trailing edge;

a roller having a having a proximal end and a distal end and a first diameter, said roller disposed between said top plate and said base plate and capable of fictionally engaging a bottom surface of said top plate and a top surface of said slipsheet tab;

a means for disengaging said roller from said bottom surface of said top plate and said top surface of said slipsheet tab by moving the roller toward the divergent end of said cross-sectional area; and a means for transmitting tension to said base plate leading edge to maneuver said drawbar device;

(b) engaging said slipsheet tab by simultaneously disengaging said roller from said bottom surface of said top plate and said top surface of said slipsheet tab by moving the roller toward the divergent end of said cross-sectional area and sliding said drawbar device over said slipsheet tab;

(c) attaching a means for transmitting tension to said base plate leading edge;

(d) locking said slipsheet tab in place by frictionally engaging said roller with said bottom surface of the top plate and said top surface of the slipsheet tab by transmitting tension to said base plate leading edge;

(e) applying sufficient force to maneuver said drawbar device to a second location;

(f) disengaging said drawbar device by simultaneously pushing said drawbar device toward said slipsheet tab and disengaging said roller from said bottom surface of said top plate and said top surface of said slipsheet tab by moving the roller toward the divergent end of said cross-sectional area; and (g) sliding said drawbar device away from said slipsheet tab.

* * * * *